July 3, 1962 T. B. WADE 3,042,129
GROUND EFFECT VEHICLE HAVING AN ADJUSTABLE PRESSURE PLATE
Filed Oct. 28, 1959

INVENTOR
Thomas B. Wade
BY
ATTORNEYS

United States Patent Office 3,042,129
Patented July 3, 1962

3,042,129
GROUND EFFECT VEHICLE HAVING AN
ADJUSTABLE PRESSURE PLATE
Thomas B. Wade, 3201 Peacock Lane,
Rolling Meadows, Ill.
Filed Oct. 28, 1959, Ser. No. 849,403
7 Claims. (Cl. 180—7)

This invention relates generally to ground effect vehicles, and more specifically to a pivotally supported pressure plate incorporated therein.

Although the principles of the present invention may be included in various vehicles of the ground effect type, a particularly useful application is made in such vehicles as are intended to be operated over a terrain having a variable contour.

Ground effect vehicles have heretofore employed a rigidly supported pressure plate. In the operation of such a vehicle, the attitude of the vehicle as a whole with respect to the terrain has been such that the pressure plate has been substantially parallel to the terrain, whereby the vehicle itself as a unit tends to assume attitudes in accordance with the contour of the terrain, since the pressure plate has been rigidly secured thereto.

A vehicle of this type when in operation is actually supported by a pocket or bubble of air which is maintained beneath the pressure plate, there being no part of the vehicle in direct engagement with the ground. In such instances, there are a few inches of clearance with respect to the road or other ground terrain. If such a vehicle be operated along a road, the surface of which is crowned and therefore sloping downwardly toward its edges, there is a tendency for the vehicle to slip in a direction transverse to the direction of the road, and in effect to slide down hill following the curvature of the road laterally. Further, the vehicle attitude is also inclined as a function of the curvature of the surface of the road.

The present invention contemplates the utilization of means for pivotally supporting the pressure plate so as to create a wedge-shaped pocket or air bubble therebeneath, such air pocket or bubble being complemental to the lateral slope of a road so that the vehicle is not only at least partially leveled, but also so that gravity will not act to cause the vehicle to slip sidewards along the lateral road curvature. Further, by the selective creation of the wedge-shaped air pocket, turns which are substantially coordinated may be accomplished. In a coordinated turn, the centrifugal force of the vehicle is substantially equal to the oppositely directed force created by lateral road slope or curvature. Where these are in fact not as close to exactly equal as is desired, the pivotally supported pressure plate of my invention may be positioned so as to create added forces which vectorially aid in achieving a substantially coordinated turn.

Accordingly, it is an object of the present invention to provide a ground effect vehicle which is capable of being operated transversely to the slope of the terrain without sliding in the direction of the terrain slope.

Another object of the present invention is to provide a ground effect vehicle which may be operated in an attitude more nearly corresponding to a true horizontal than is the terrain beneath the vehicle.

Yet another object of the present invention is to provide a ground effect vehicle capable of being controlled to provide substantially coordinated turns.

A still further object of the present invention is to provide a ground effect vehicle, the attitude of which may be altered in either direction about substantially any horizontal axis.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

Figure 1:
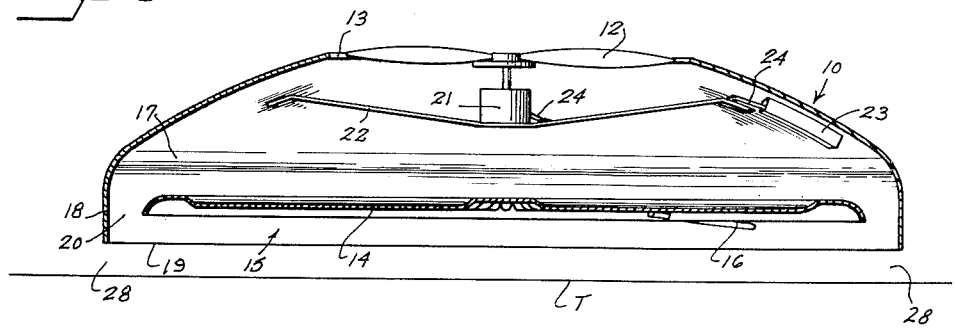
FIGURE 1 is a cross-sectional view of a ground effect vehicle equipped with a pressure plate provided in accordance with the principles of the present invention.
Figure 4:
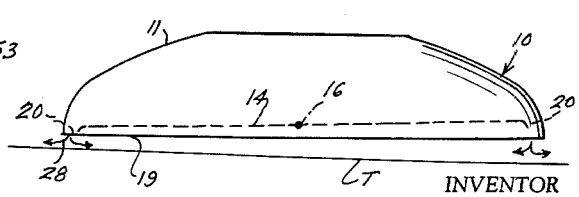
FIGURE 4 is a side elevational view, in reduced scale, of the structure shown in FIGURE 1.

The principles of this invention are particularly useful when embodied in a ground effect vehicle such as illustrated in FIGURES 1 and 4, generally indicated by the numeral 10. The vehicle structure includes a shell shown in elevation in FIGURE 4 and generally indicated by the numeral 11, a driven propeller 12 shown in elevation in FIGURE 1 and disposed at an upwardly directed opening 13 at one end of the shell 11, a pressure plate 14 disposed at a downwardly directed opening 15 at the opposite end of the shell, and a support structure 16 pivotally supporting the pressure plate for movement about a horizontal axis.

The shell 11 may be constructed in any convenient way so as to define a duct 17 which provides communication between the openings 13 and 15. As is apparent from FIGURE 1, the shell 11 of this embodiment is of unitary construction, and includes a tubular or cylindrical portion 18 disposed opposite to the opening 13 so that its lower edge 19 defines the opening 15. Since the pressure plate 14 is disposed within the tubular portion 18, and is of smaller diameter or extent, there is also defined an annular orifice 20 between the tubular portion 18 and the periphery of the pressure plate 14. It will also be noted that the pressure plate 14 is disposed in downstream relation to the propeller 12 and in axially upstream spaced relation to the lower edge 19 of the shell. The cylindrical portion 18 is of larger diameter than the portion of the shell 11 which defines the opening 13. However, the effective size of the orifice 20 is such that when air is forced through the orifice 20, there is a pressure drop across the same.

The propeller 12 is driven by a motor or engine 21 supported by a group of struts 22 within the duct 17, the struts 22 being secured to the shell 11. Where the driving means 21 is an engine, there is provided a fuel storage cell 23 connected by a line 24 to the engine 21. Where the driving means 21 is a motor, the part 23 illustrates a power supply connected by a line 24 to such motor 21. It is to be understood that any means for drawing air through the opening 13 and forcing such air out through the orifice 20 and the opening 15 at the opposite end may be employed.

In this embodiment, the support structure 16 comprises a pin, rod or shaft which is secured to the plate 14 and which is also secured to the cylindrical portion 18 of the shell 11. It is to be understood that another shaft 16 may be employed diametrically opposite thereto in that part of the device which is cut away by sectioning. The support structure 16 has an axis which is substantially horizontal, and the nature of its fit with at least one of the pressure plate 14 and the shell 11 is such as to permit pivoting therebetween. Thus the pressure plate 14 is so supported as to permit angular movement in either direction from a substantially horizontal position. It is to be understood that the details of the pivotal support structure 16 may be varied, a fact which is brought out further herein.

Figure 2:
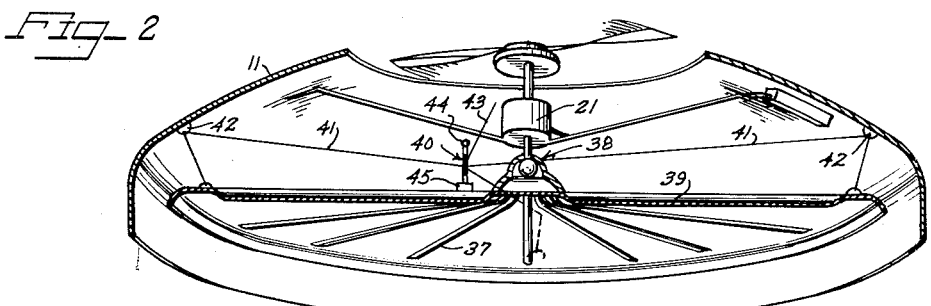
FIGURE 2 is a cross-sectional view, partly in perspective from below, of a ground effect vehicle provided in accordance with the present invention wherein the pressure plate is supported in a modified manner.

It is to be understood that the friction present in the pivotal support structure 16 may be sufficient to hold the pressure plate 14 in a selected position. On the other hand, the angular friction in the support structure 16 may be made to be relatively low. When this is done, additional means, such as shown in FIGURE 2 and described below, may be employed to effect and to maintain a selected amount of angular movement and thus to hold the pressure plate in a desired position. It is apparent that the extent of the angular movement about the pivotal axis of the support structure 16 is limited, particularly by the spacing between the periphery of the pressure plate 14 and the lower edge 19, as is more fully brought out herein. It is also to be understood that the positioning means of FIGURE 2 is exemplary, and that other structures are capable of effecting and maintaining a selected amount of limited angular movement.

The device shown in FIGURE 1 normally rests on its lower edge 19 which directly engages supporting terrain T also shown in FIGURE 4. When air is drawn through the opening 13 and forced out through the orifice 20, there builds up a pressure in the cavity or space beneath the pressure plate 14 which is defined by the cylindrical portion 18 and the terrain. When this pressure is sufficient, the air rushes outwardly past the lower edge 19 throughout its perimetral extent. However, it cannot do so unless the vehicle as a whole is raised, a fact which occurs due to such discharge of air. The relatively large annular orifice gives the vehicle the needed horizontal stability so that it rises substantially vertically by a small amount above the terrain as shown in FIGURE 1. Under this condition, there is in effect a constriction to flow at the point indicated by the numeral 28 so that the pressure beneath the shell and the pressure plate is greater than it is on the outside.

The vehicle may be moved horizontally by any convenient means, and if my invention be embodied in a model or a toy, such means can comprise a string (not shown) secured to the shell 11 so that the device may be moved in the manner of a pull-toy. Preferably, the direction of movement horizontally is parallel to the axis of the support means 16. If the terrain slopes upwardly or downwardly in the direction of such horizontal movement, this vehicle will react thereto much in the same manner as wheel-supported vehicles do on slopes. However, wheeled vehicles do not normally slide laterally in the event that there is a lateral slope to the terrain. In FIGURE 4, there is illustrated a slight lateral slope of the terrain T, such terrain being lower at the right end of the drawing than at the left end. If the pressure plate 14 be left in the attitude shown in FIGURE 1, and if the vehicle is moving perpendicularly to that of the plane of the drawing, when the vehicle approaches the sloping terrain shown in FIGURE 4, the vehicle would gradually slide to the right. However, if the pressure plate 14 be pivoted slightly about the horizontal axis of the pivotal support 16, in a counterclockwise direction as shown in FIGURE 4, the left hand shown portion of the annular orifice 20 will become slightly less efficient, and the right hand portion shown of the orifice 20 will become slightly more efficient. This has the effect of creating a wedge-shaped cavity or space in the duct downstream of the orifice 20, such cavity or space being of variable wedge angle, and always being beneath the pressure plate. This wedge-shaped cavity permits the creation of a wedge-shaped air pocket or bubble which is generally complemental to the sloping terrain T, so that the levelness of the vehicle 10 is generally restored, not withstanding the fact that the terrain may be sloping laterally beneath the vehicle. Not only is the levelness of the vehicle restored, but there is no vector force under this condition which acts to cause the vehicle to slide laterally down the slope of the terrain. If the pressure plate be horizontal as shown in FIGURE 1 for straight and level terrain, and a turn is to be negotiated by the vehicle as a whole, the pressure plate 14 may be slightly pivoted about the horizontal axis of the support means 16 to create a vector force tending to cause the vehicle to slide down the air bubble or pocket toward a point within the turning arc. The amount of this vector force is controlled by the amount of pivotal or angular movement imparted to the plate, and is selected to just counterbalance the centrifugal force or angular acceleration of the device in going about the turn, whereby the vehicle does not slip inwardly or slide outwardly from its intended path, such being a coordinated turn.

It is to be understood that the exact mode of pivotally supporting the pressure plate 14 for limited angular movement about a horizontal axis is not to be limited to that shown in FIGURE 1. In fact, it is contemplated that the invention may be utilized in combination with terrain slopes which are directed at various angles with respect to the direction of horizontal movement. Where the vehicle as a whole is not to be rotated, it is thus necessary that the effective pivotal axis be rotatable or selectable so as to be directed substantially in the direction of such slope. To this end, I have provided the modifications of the invention shown in FIGURES 2 and 3, by which the relative azimuth direction of the pivotal axis may be selected. It is to be understood that the term "pivotal axis" as used in connection with these figures is to be broadly construed to include an effective axis which may be the combination of or resultant of pivoting about two axes. In each of the embodiments of FIGURES 2 and 3 there are means provided which are supported by the structure and which support the pressure plate to permit universal pivoting of the plate and the orifice surrounding it about any horizontal axis.

In the modification shown in FIGURE 2, a ball and socket joint 38 is provided between a modified pressure plate 39 and the engine 21. The ball and socket joint 38 permits direct pivoting of the pressure plate 39 in any direction. As in the case of the FIGURE 1 structure, if the pivotal connection 38 does not have sufficient friction to maintain a selected angular position of the pressure plate 39, means generally indicated at 40 may be employed to effect selective angular movement of the pressure plate and to maintain the selected angular position thereof. To this end, the means 40 includes a control stick with a suitable actuating cable 41 extending in either direction therefrom through eyelets or pulleys 42 to the periphery of the pressure plate 39. A second cable 43, partly broken away due to sectioning and partly obscured by the pressure plate 39, is disposed at generally right angles to the cable 41 and is similarly guided and fastened. Each of the cables 41 and 43 is laterally offset to the extent needed from the pivotal connection 38. It will be appreciated that the stick 44 may be so moved that only one of the cables effects plate pivoting, and that it may be moved to obtain a composite pivoting whereby the effective horizontal pivotal axis is directed as selected, namely at right angles to the stick movement. It will also be appreciated that the friction in the supporting connection at the numeral 45 of the stick will supplement the friction in the pivotal connection 38 to hold the plate in a preselected angular attitude, if desired.

It will be appreciated that when the vehicle is airborne, a considerable force is applied against the pressure plate 39. Accordingly, suitable plate stiffening means 37 in the nature of rigid radial deformations or braces are provided to give the plate 39 the requisite rigidity.

Figure 3:
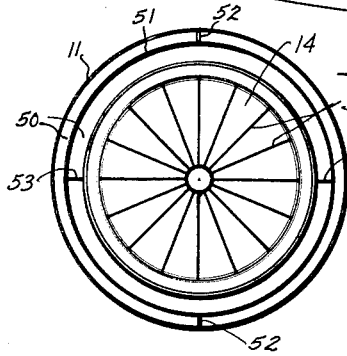
FIGURE 3 is a bottom view, in reduced scale of a still further modification of the present invention.

The structure shown in FIGURE 3 is a bottom view of yet another modification by which the pressure plate is supported for pivotal movement in a manner to permit universal pivoting of the plate and the orifice about any horizontal axis. This structure employs a shell 11 such as shown in FIGURES 1 and 2 and employs a pressure plate 14 such as shown in FIGURE 1. In the orifice 50 between the pressure plate 14 and the shell 11, there is disposed a Cardan ring 51 which has pivotal connections at 52 with the shell 11, and 53 with the plate 14. Each of the connections 52, 53 is structurally equivalent to the pivotal connection 16 shown in FIGURE 1, and therefore the plate 14 is pivotable about a horizontal axis extending through the connections 53 and is also pivotable about a second horizontal axis at right angles thereto and extending through the pivotal connections 52. By this arrangement, and by a composite selection of the amount of pivoting, the effective pivotal axis of the plate 14 may be directed in any manner, and hence is of universal nature. Any convenient means may be employed to effect the composite pivoting of the plate 14, and to insure maintenance of the selected angular attitude thereof. An example of such means is shown in FIGURE 2.

The operation of each of the modifications shown in FIGURES 2 and 3 is identical to that shown in FIGURE 4, but wherein the point 16 indicates the effective horizontal axis selected.

I have found that if the pressure plate be pivoted an excessive amount, the air compressed into the pocket or cavity below the pressure plate escapes or slips out radially, thus causing a loss of support at the periphery where such is occurring, and therefore an engagement by the periphery with the ground or terrain. Such grounding does ordinarily not occur within the usual range of angular movement of the pressure plate. The pressure plate is functionally imperforate and its downturned edge aids in stiffening the same, a factor which is important in the event of excessive plate pivoting and possible grounding also of an edge of the pressure plate. Means such as the cables 41, 41 are alternatively under tension when the plate is deflected. The selected position of means such as 40 will yield in response to grounding of the pressure plate, which movement is in a direction which tends to reestablish the compressed air bubble or pocket beneath the pressure plate, and hence imparts a degree or type or self stabilization to the vehicle, which is especially useful when the vehicle is in an attitude other than parallel to the ground.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A vehicle comprising in combination: a shell defining a duct having an upwardly directed opening at one end and a downwardly directed opening at the opposite end, said openings being in communication with each other; means supported in said duct for drawing air through said one end and for forcing such air out through said opposite end; a substantially imperforate pressure plate disposed within said duct in downstream relation to said air-drawing-and-forcing means and having a periphery spaced from the internal periphery of the duct and defining with said shell an annular orifice through which such air is forced; and support structure connecting said plate to said shell, said structure comprising a pivotal connection enabling selective pivoting of said plate with respect to said shell about a substantially horizontal axis.

2. A vehicle comprising in combination: a shell defining a duct having an upwardly directed opening at one end and a downwardly directed opening at the opposite end, said openings being in communication with each other; means supported in said duct for drawing air through said one end and for forcing such air out through said opposite end; a substantially imperforate pressure plate disposed within said duct in downstream relation to said air-drawing-and-forcing means and having a periphery spaced from the internal periphery of the duct and defining with said shell an annular orifice through which such air is forced; means secured to and supporting said plate in such a manner as to enable selective pivoting of said plate with respect to said shell, said pivoting being about a substantially horizontal axis; and a selectively movable mechanism acting between said shell and said plate for effecting said pivoting.

3. A vehicle comprising in combination: a shell defining a duct having an upwardly directed opening at one end and a downwardly directed opening at the opposite end, said openings being in communication with each other; means supported in said duct for drawing air through said one end and for forcing such air out through said opposite end; a substantially imperforate pressure plate disposed within said duct in downstream relation to said air-drawing-and-forcing means and having a periphery spaced from the internal periphery of the duct and defining with said shell an annular orifice through which such air is forced; means secured to and supporting said plate in such a manner as to enable selective pivoting of said plate with respect to said shell, said pivoting being about a substantially horizontal axis; and a selectively movable mechanism acting between said shell and said plate for maintaining said plate in a selected pivoted position with respect to said shell to define a wedge-shaped cavity in said duct as said opposite end downstream of said orifice.

4. A vehicle comprising in combination: a shell defining a duct having an upwardly directed opening at one end and a downwardly directed opening at the opposite end, said openings being in communication with each other; means supported in said duct for drawing air through said one end and for forcing such air out through said opposite end; a substantially imperforate pressure plate disposed within said duct in downstream relation to said air-drawing-and-forcing means and having a periphery spaced from the internal periphery of the duct and defining with said shell an annular orifice through which such air is forced; and means secured to and supporting said plate, said means comprising a pivotal connection constructed to enable selective pivoting of said plate with respect to said shell, said pivoting being about a substantially horizontal axis, said means further permitting the selection of the relative azimuth direction in which said horizontal axis is effectively directed.

5. A vehicle comprising in combination: a structure including a shell defining a duct having an upwardly directed opening at one end, and having a tubular portion at the opposite end with a lower edge thereof defining a downwardly directed opening, said openings being in communication with each other; a substantially imperforate pressure plate disposed within said tubular portion in axially spaced relation to said lower edge and having a periphery spaced from the internal periphery of said tubular portion and defining an annular orifice therebetween; means supported by said structure in said duct for drawing air through said one end and for forcing such air out through said orifice; and means comprising a pivotal connection supported by said structure and secured to and supporting said plate, said pivotal connection being disposed and arranged to enable limited pivotal movement of said pressure plate about a substantially horizontal axis with respect to said tubular portion; whereby said pressure plate and said lower edge may selectively jointly define a generally wedge-shaped space beneath said pressure plate of variable wedge angle.

6. A vehicle comprising in combination: a structure including means defining a duct with an upwardly directed opening at one end and a downwardly directed opening at the opposite end, said openings being in communication with each other; means supported in said duct by said structure for drawing air through said one end and for forcing such air out through said opposite end; a substantially imperforate pressure plate disposed within said duct in downstream relation to said air-drawing-and-forcing means and having a periphery spaced from an adjacent portion of said structure and defining therewith, an annular orifice through which such air is forced; and means supported by said structure and supporting said pressure plate, said means having a structure enabling universal pivoting of said pressure plate and said orifice about any horizontal axis.

7. A vehicle comprising in combination: a unitary shell defining a duct having an upwardly directed opening at one end, and having a cylindrical portion of larger diameter at the opposite end with a lower edge thereof defining a downwardly directed opening, said openings being in direct communication with each other; means supported by said shell for drawing air through said one end and for forcing such air out through said opposite end; a substantially imperforate pressure plate disposed within said cylindrical portion in axially spaced relation to said lower edge, said pressure plate having a periphery spaced from the internal periphery of said cylindrical portion and jointly defining therewith an annular orifice therebetween; means acting between said pressure plate and said cylindrical portion and pivotally supporting said pressure plate for limited angular movement thereof in either direction about a substantially horizontal axis; and additional means acting between said shell and said pressure plate at a point on said pressure plate remote from said horizontal axis for effecting and maintaining a selected amount of said limited angular movement.

References Cited in the file of this patent
FOREIGN PATENTS 219,133    Australia _____ Jan. 8, 1959

OTHER REFERENCES

Publication: "Popular Science," July 1959, pgs. 51, 52, 53, 54, 55, 194; article entitled, "Here Come Cars Without Wheels."

Publication, "Aviation Week," July 6, 1959, pgs. 115, 116.